F. V. CARMAN.
TRUCK.
APPLICATION FILED AUG. 24, 1914.

1,166,812.

Patented Jan. 4, 1916.
2 SHEETS—SHEET 1.

WITNESSES:

INVENTOR
Frank V. Carman
BY
ATTORNEYS

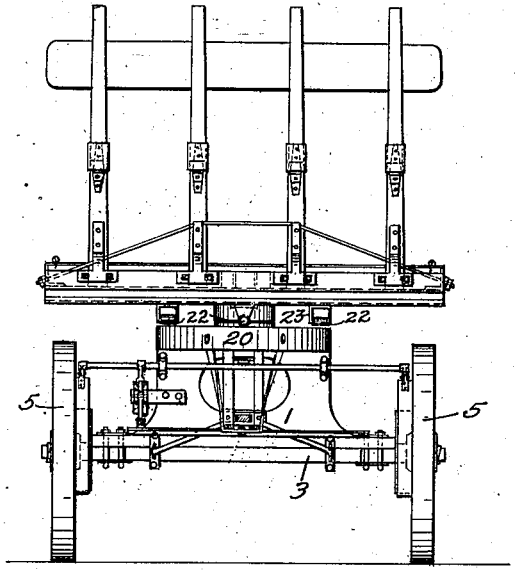

UNITED STATES PATENT OFFICE.

FRANK V. CARMAN, OF OAKLAND, CALIFORNIA.

TRUCK.

1,166,812. Specification of Letters Patent. Patented Jan. 4, 1916.

Application filed August 24, 1914. Serial No. 858,243.

*To all whom it may concern:*

Be it known that I, FRANK V. CARMAN, a citizen of the United States, residing at Oakland, in the county of Alameda and State of California, have invented certain new and useful Improvements in Trucks, of which the following is a specification.

The present invention relates to improvements in trucks and more particularly to a type of truck adapted for the handling of baggage and the like, and the invention has for its principal objects to provide a truck capable of being turned in a short space, one having a telescoping tongue at each end which enables the same to be handled at either end, one equipped with hinged end body members, and one provided with other refinements hereinafter more fully set forth.

With the above mentioned and other objects in view, the invention consists in the novel construction and combination of parts hereinafter more fully described; illustrated in the accompanying drawings, and set forth in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying sheets of drawings, wherein—

Figure 1:
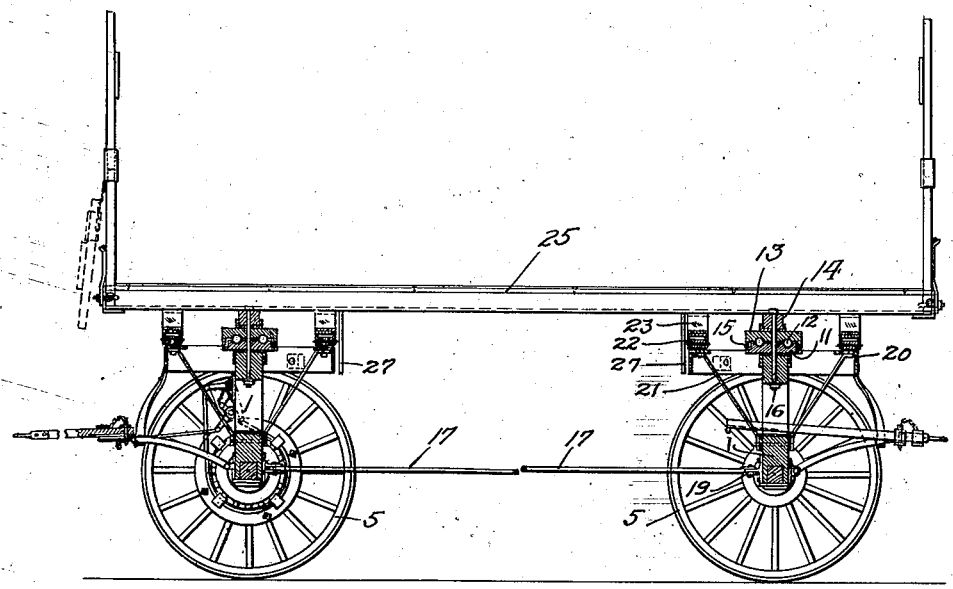
Figure 2:
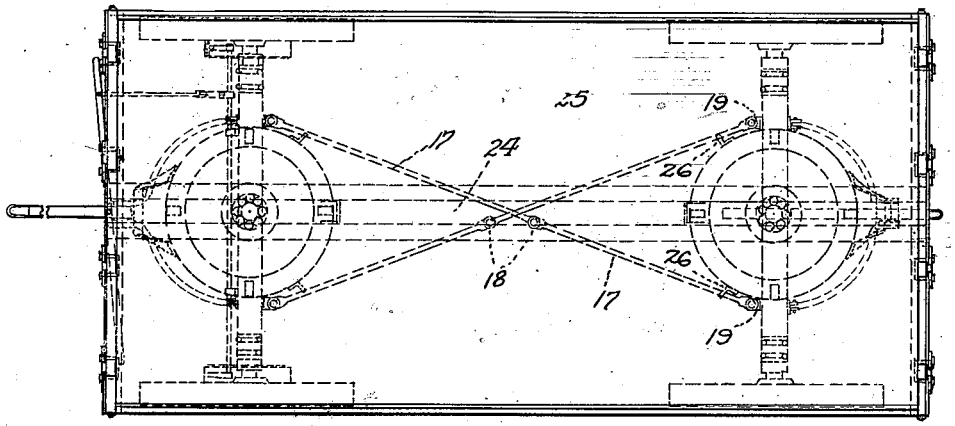

Figure 1 discloses a view in side elevation of my invention partly in section. Fig. 2 is a top plan view, disclosing the rods connecting the truck members. Fig. 3 is a view in end elevation.

Referring more particularly to the figures of the drawings, wherein like characters of reference designate corresponding parts throughout the several views, the numerals 1 indicate suitable truck bolsters, each carrying an axle 3, on the spindles of which are mounted the wheels 5.

Each truck bolster carries an annular bearing support 11 formed with a suitable annular groove in which are positioned the ball bearings 12 which also seat in an annular groove formed in an annular member 13 carried by the respective body bolsters 14. The members 13 are formed with a down-turned annuar flange 15 to exclude dust and grit from the ball raceways and suitable king bolts 16 pivotally secure the respective truck and body bolsters together.

Suitable crossed connecting rods 17, each jointed within its length, as at 18, are pivotally connected at their opposite ends to brackets 19 carried by the truck bolsters and provide a means for turning the truck in a limited space. An annular bearing ring 20 is carried by each truck bolster on the supports 21 and said rings are adapted to coöperate with roller bearings 22 carried by brackets 23, certain of which depend from the body bolsters 14, and certain other of which are carried by the longitudinal frame member 24 of the wagon body 25 which rests on the body bolsters 14 and is secured thereto in any suitable manner. The bearing rings 20 and bearings 22 provide a means for stabilizing the body when the wheels are positioned to turn a corner, and also relieve the strain on the king bolts and main bearings. Each of said annular bearing rings 20 carry on their outer rear surface spaced lugs 26 adapted to coöperate with members 27 depending from the longitudinal frame member 24 and limit the turning of the truck bolsters.

From the foregoing description it will be apparent that I have devised a simple and efficient mechanism which provides a stabilizer for the body when the wheels are positioned to turn a corner, also relieves a considerable amount of stress which is placed on the king bolt.

I claim:—

1. In a truck of the class described, the combination with a body, of wheeled supporting trucks therefor, a bolster arranged on one of said trucks, a pivotal connection between the bolster and the body comprising coöperating members carried by the bolster and body, a race-way arranged in one of the coöperating members, roller bearings in said race-way, a continuous annular bearing ring having a relatively broad smooth bearing surface and a downwardly projecting peripheral flange constituting a strengthening means therefor, entirely encircling the connecting members and spaced therefrom, brace rods secured to the truck and extending upwardly to a plane substantially the same as the bolster adapted to be secured to the bearing ring to provide a support for the weaker portion of the said ring, and to leave the relatively wide surface of the bearing ring smooth, and a series of spaced brackets depending from the body for engagement with the smooth surface of the bearing ring adapted to provide a stabilizer for the body.

2. In a truck of the class described, in combination with the body of wheeled supporting trucks therefor, a bolster arranged on one of said trucks, a pivotal connection between said bolster and body comprising coöperating members carried by the bolster and body, a race-way in one of said members, antifriction rollers in said race-way, a continuous bearing ring spaced from said connecting members and entirely encircling the same, said bearing member being of substantially an inverted L shaped formation and having a relatively broad bearing surface and a downwardly projecting peripheral flange constituting a strengthening means therefor, bracing means for said bearing member comprising brace rods attached to each side of the truck and inclining upwardly, and being secured at their free ends to the bearing ring, members connected by the body adapted to engage the relatively broad bearing surface of the ring to provide a stabilizer for the said body and an outwardly extending stop rigidly fastened to a peripheral flange of the bearing ring, and a vertically extending bearing projecting from the body and engaging the stop to limit the turning movement of the stop.

In testimony whereof I have signed my name to this specification in the presence of two subscribing witnesses.

FRANK V. CARMAN.

Witnesses:
HARRY A. TOTTEN,
D. B. RICHARDS.